US008448145B2

(12) United States Patent
Ganai et al.

(10) Patent No.: US 8,448,145 B2
(45) Date of Patent: May 21, 2013

(54) METHODS AND SYSTEMS FOR REDUCING VERIFICATION CONDITIONS FOR CONCURRENT PROGRAMS USING MUTUALLY ATOMIC TRANSACTIONS

(75) Inventors: Malay K. Ganai, Plainsboro, NJ (US); Sudipta Kundu, Hillsboro, OR (US)

(73) Assignee: NEC Laboratories America, Inc., Princeton, NJ (US)

( * ) Notice: Subject to any disclaimer, the term of this patent is extended or adjusted under 35 U.S.C. 154(b) by 757 days.

(21) Appl. No.: 12/569,557

(22) Filed: Sep. 29, 2009

(65) Prior Publication Data
US 2010/0088680 A1     Apr. 8, 2010

Related U.S. Application Data

(60) Provisional application No. 61/103,275, filed on Oct. 7, 2008.

(51) Int. Cl.
*G06F 9/44* (2006.01)

(52) U.S. Cl.
USPC ........................................................ 717/126

(58) Field of Classification Search .................... 717/126
See application file for complete search history.

(56) References Cited

U.S. PATENT DOCUMENTS

| 2002/0188651 | A1* | 12/2002 | Choi et al. ...................... 709/107 |
| 2006/0130030 | A1* | 6/2006 | Kwiat et al. .................. 717/159 |
| 2007/0143742 | A1* | 6/2007 | Kahlon et al. ................. 717/124 |
| 2007/0245312 | A1* | 10/2007 | Qadeer et al. ................. 717/124 |

OTHER PUBLICATIONS

Alur, R., et al. Partial-Order Reduction in Symbolic State Space Exploration. Proceedings of the 9th International Conference on Computer-aided Verication (CAV 97). Lecture Notes in Computer Science. Jun. 1997. pp. 1-12.
Ganai, M., et al. Efficient Modeling of Concurrent Systems in BMC. Model Checking Software, 15th International SPIN Workshop. Lecture Notes in Computer Science. Aug. 2008. pp. 1-18.
Kahlon, V., et al. Symbolic Model Checking of Concurrent Programs Using Partial Orders and On-The-Fly Transactions. In Proceedings of the International Conference on Computer Aided Verification (CAV), Aug. 2006. (14 pages).
Rabinovitz, I., et al. Bounded Model Checking of Concurrent Programs. In Computer-Aided Verification (CAV), LNCS 3576. Jul. 2005. pp. 82-97.
Wang, C., et al. Peephole Partial Order Reduction. In Proceedings of the International Conference on Tools and Algorithms for Construction and Analysis of Systems (TACAS), Mar. 2008, pp. 1-18.

\* cited by examiner

*Primary Examiner* — Li B Zhen
*Assistant Examiner* — Lenin Paulino
(74) *Attorney, Agent, or Firm* — Joseph Kolodka; James Bitetto

(57) ABSTRACT

Methods and systems for generating verification conditions and verifying the correctness of a concurrent system of program threads are described. The methods and systems determine and employ mutually atomic transactions to reduce verification problem sizes and state space for concurrent systems. The embodiments provide both an adequate and an optimal set of token-passing constraints for a bounded unrolling of threads.

17 Claims, 8 Drawing Sheets

METHODS AND SYSTEMS FOR REDUCING VERIFICATION CONDITIONS FOR CONCURRENT PROGRAMS USING MUTUALLY ATOMIC TRANSACTIONS

RELATED APPLICATION INFORMATION

This application claims priority to provisional application Ser. No. 61/103,275 filed on Oct. 7, 2008 incorporated herein by reference.

BACKGROUND

1. Technical Field

The present invention relates to verification of multi-threaded programs and, more particularly, to verification of multi-threaded programs using an asynchronous symbolic approach.

2. Description of the Related Art

Verification of multi-threaded programs is a difficult task due to complex and un-expected interleaving between the threads. In practice, verification efforts often use incomplete methods, or imprecise models, or sometimes both, to address the scalability of the problem. The verification model is typically obtained by composing individual thread models using interleaving semantics. Model checkers are applied to the verification model systematically explore the global state space.

To combat the state explosion problem, most methods employ partial-order reduction techniques to restrict the state-traversal to only a representative subset of all interleavings, thereby avoiding exploring redundant interleaving among independent transitions. Explicit model checkers explore the states and transitions of a concurrent system by explicit enumeration, while symbolic model checkers use symbolic methods. Based on how verifications models are built, symbolic approaches can be broadly classified into: synchronous modeling, which employs a scheduler, and asynchronous modeling, which does not employ a scheduler.

In the synchronous modeling category of symbolic approaches, a synchronous model of concurrent programs is constructed with a scheduler. The scheduler is then constrained by adding guard strengthening to explore only a subset of interleaving. To guarantee correctness and cover all necessary interleavings, the scheduler must permit context-switches between accesses that are conflicting (i.e., dependent). Persistent/ample set computations can be employed to statically determine which pair-wise locations need context switches. Lock-set and/or lock-acquisition history analysis and conditional dependency can also be used to reduce the set of interleavings needed to be explored (i.e., remove redundant interleavings). Even with these state reduction methods, the scalability problem remains. To overcome the problem, researchers have employed sound abstraction with a bounded number of context switches (i.e., under-approximation), while some others have used finite-state model abstractions combined with a proof-guided method to discover the context switches.

In asynchronous category, the symbolic approaches such as Threaded C-Bounded Model Checking (TCBMC) generate verification conditions directly without constructing a synchronous model of concurrent programs, i.e., without using a scheduler. These verification conditions are then solved by satisfiability (SAT) solvers. To knowledge of the inventors, thus far, the state-reduction based on partial-order has hardly been exploited in the asynchronous modeling approaches.

SUMMARY

In accordance with exemplary implementations of the present principles, mutually atomic transactions may be employed to reduce the number of token-passing constraints considered for verification purposes, thereby reducing both the number of verification conditions and the state space explored to verify the correctness of a concurrent system of program threads. Moreover, it can be shown that the token-passing constraints determined using mutually atomic transactions are both adequate and optimal.

In one exemplary embodiment of the present invention, a computer implemented method for verifying the correctness of a concurrent system of program threads includes identifying, for each pair of the program threads, a set of pair-wise, conflicting program thread locations at which access of shared memory resources by the corresponding pair of program threads is conflicting; determining, for each pair of the program threads, a set of mutually atomic transactions (MATs), wherein, between threads in said pair, only the last thread program locations in said transactions are conflicting; constructing, with respect to each pair of program threads, token passing constraints between conflicting program thread locations and initial thread locations in corresponding MATs to permit context switching between threads in a respective pair of program threads; and verifying the correctness of the concurrent system of program threads by employing verification conditions that are generated based on the constructed token passing constraints.

In an alternative exemplary embodiment of the present invention, a computer readable medium comprises a computer readable program embodying a program of instructions for generating verification conditions for a concurrent system of program threads, the instructions executable by a computer, wherein the computer readable program when executed on a computer causes the computer to identify, for each pair of the program threads, a set of pair-wise, conflicting program thread locations at which access of shared memory resources by the corresponding pair of program threads is conflicting; determine, for each pair of the program threads, a set of mutually atomic transactions (MATs), wherein, between threads in said pair, only the last thread program locations in said transactions are conflicting; construct, with respect to each pair of program threads, token passing constraints between conflicting program thread locations and initial thread locations in corresponding MATs to permit context switching between threads in a respective pair of program threads; and generate verification conditions based on the token passing constraints for the concurrent system.

Another exemplary embodiment of the present invention includes a verification system for generating verification conditions to permit verification of a concurrent system of program threads. The verification system is implemented on a processor and a program storage device and comprises: a conflicts identifier module configured to identify, for each pair of the program threads, a set of pair-wise, conflicting program thread locations at which access of shared memory resources by the corresponding pair of program threads is conflicting; a mutually atomic transactions (MAT) analyzer configured to determine a set of MATS for each pair of program threads; and a token passing constraint generator configured to construct, with respect to each pair of program threads, token passing constraints between conflicting program thread locations and initial thread locations in corresponding MATs to permit context switching between threads in a respective pair of program threads, wherein said token passing constraint generator is further configured to generate verification conditions for the concurrent system.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Verification of concurrent programs entails exploration of a minimum set of representative thread interleaving (i.e., traces) that are equivalent to all possible interleaving to guarantee correctness. New symbolic methods are described herein below that are based on partial order reduction and that generate reduced verification conditions for a multi-threaded concurrent system with shared variables and locks. The methods guarantee correctness by removing constraints that correspond to redundant interleaving. The methods incorporate some aspects of a token-based approach, discussed further herein below, which generates verification conditions directly without an explicit scheduler. However, unlike the token-based approach, concurrency constraints are not added between all pair-wise global accesses. Thus, in accordance with aspects of the present invention, redundant interleavings can be eliminated.

Exemplary features of the present invention include the notion of Mutually Atomic Transactions (MAT). For example, two transactions are mutually atomic when there exists exactly one conflicting shared-access pair between them. Methods and systems disclosed herein enable the reduction of verification conditions and removal of redundant interleavings by permitting pair-wise, token-passing constraints only between mutually atomic transactions. In other words, a token can pass from the end of one transaction to the beginning of the other transaction (not in between), and vice versa.

In addition, given a multi-threaded system where each thread execution is bounded, exemplary method and system embodiments of the present invention identify all MATs that would preserve all the needed interleavings permitted by the multi-threaded system. In other words, MAT-based reduction disclosed herein is adequate. Note, the number of MATs in the worst case is quadratic in number of shared accesses, but in practice, it is much less. Moreover, for a given dependency set of conflicting accesses, the MAT-reduced systems and methods disclosed herein do not allow two interleavings that are Mazurkiewicz equivalent. As such, the reduction is optimal. Further, to further reduce the necessary pair-wise constraints, simultaneous unreachability of conflict access is exploited. For example, unreachability may be deduced by employing happens-before relations using fork-join or by employing mutual exclusion due to locking patterns in the program structure. Additionally, thread-specific context bounding, and fork-join semantics can be efficiently encoded in verification conditions. Experimental results on large concurrent programs show that methods and systems in accordance with the present invention reduces the verification problem significantly.

Figure 1:
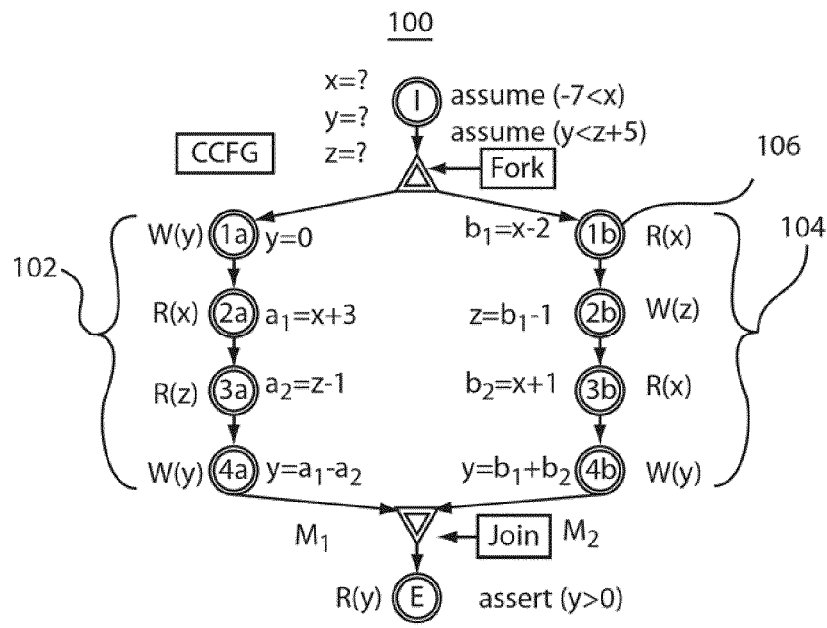
FIG. 1 is a control flow graph illustrating concurrent program threads.

Referring now in detail to the figures in which like numerals represent the same or similar elements and initially to FIG. 1, an exemplary two-threaded concurrent system 100 is described to aid in understanding of the invention. The concurrent system 100 comprises threads $M_1$ 102 and $M_2$ 104 with local variables $a_i$ and $b_i$, respectively, and shared (global) variables x, y, z. This shown in FIG. 1 as a concurrent control flow graph (CCFG) with a fork-join structure. Each shared statement associated with a node 106 is atomic, i.e., it cannot be interrupted. Further, each node is associated with at most one shared access. A node with a shared write/read access of variable x is identified as W(x)/R(x). The notation '?' is used denote a non-deterministic input to a variable.

Given such a concurrent system, the goal of the token-based approach, which is described in more detail below, is to generate verification conditions that capture needed interleaving for some bounded unrolling of the threads, aimed at detecting reachability properties such as data races and assertion violations. These verification conditions together with the property constraints are encoded and solved by a Satifiability Modulo Theory (SMT) solver. A satisfiable result is typically accompanied by a trace, comprising data input valuations and a total-ordered thread interleaving, that is a witness to the reachability property. On the other hand, an unsatisfiable result is followed by these steps (a)-(c): (a) increasing unroll depths of the threads, (b) generating verification conditions for increased depths, and (c) invoking SMT solver on these conditions. Typically, the search process (i.e., to find witnesses) is terminated when a resource, such as time, memory or bound depth reaches its limit. For effective implementation, these verifications constraints are added on-thefly, lazily and incrementally at each unrolled depth. Though the approach captures all necessary interleaving, it, however, does not prevent redundant interleavings.

In accordance with exemplary aspects of the present invention, all the redundant interleavings can be removed while retaining the interleavings needed to verify correctness for a given unroll bound. Compared to the token-passing modeling approach, exemplary systems and methods can generate reduced verification conditions. To aid in understanding how redundancy may be removed, a brief overview of such a modeling approach is presented.

Token Passing Model

Figure 2:
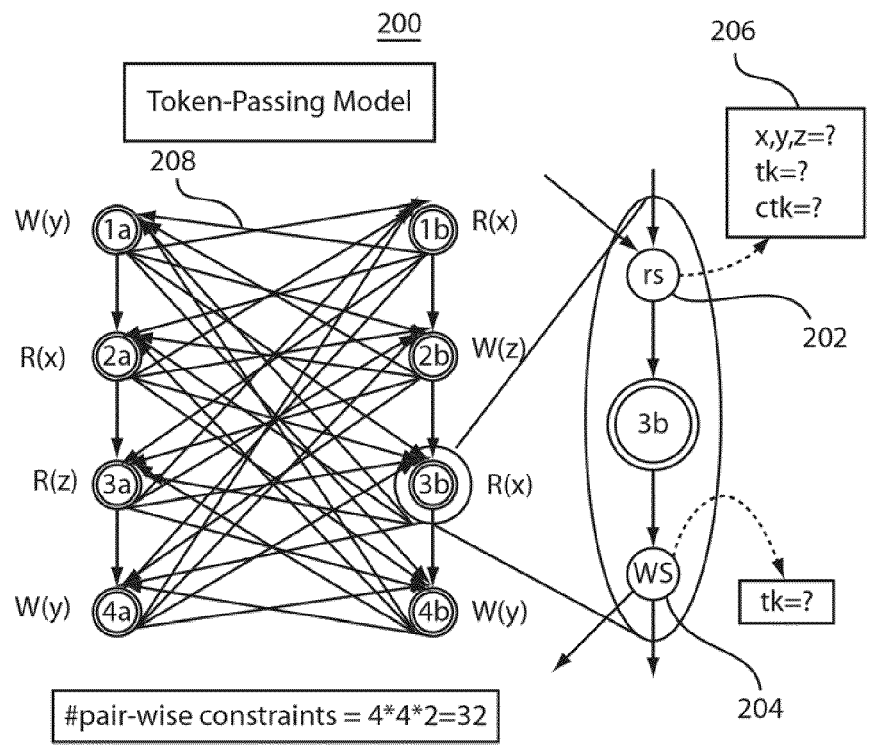
FIG. 2 is a representation of a token passing model illustrating token passing constraints between locations of concurrent program threads.

Referring to FIG. 2 with continuing reference to FIG. 1, an exemplary token-passing model (TPM) 200 is illustrated. The TPM introduces a single Boolean token (tk) and a clock vector (ctk) in a model and then manipulates the passing of the token to capture all interleavings needed to verify correctness in the given system. The clock vector records the number of times the token tk is passed and is synchronized when the token is passed. Unlike a synchronous model, TPM does not have a scheduler in the model. The verification model is obtained two phases.

In the first phase, the goal is obtain abstract and decoupled thread models. Each thread is decoupled from the other threads by localizing all the shared variables. For the example, as shown in FIG. 1, $M_1$ 102 and $M_2$ 104 are decoupled by renaming (i.e., localizing) shared variables such as x to $x_1$ and $x_2$, respectively. Each model is then abstracted by permitting renamed (i.e., localized) variables to take non-deterministic values at every shared access. As shown in FIG. 2, to achieve that, each shared access node (in every thread) is instrumented with two control states as follows: (a) an atomic pre-access control state, referred to as read_sync block 202, is inserted before each shared access, and (b) an atomic post-access control state, referred to as write_sync block 204, is inserted after each shared access. In the read_sync block, all localized shared variables obtain non-deterministic values.

For clarity of presentation, renaming of the shared variables was not shown in FIG. 2. However, they may be considered local to the thread, i.e., x of thread $M_i$ and x of $M_j$ are not the same variable. In such a model, atomic control states rs 202 and ws 204 are inserted pre and post of shared accesses in decoupled model, respectively. As highlighted for a control state 3b, the following statements 206 is added in the corresponding rs node 202: x=?, y=?, z=?, tk=?, ctk=?. Similarly, tk=? Is added in the in ws node 204. As stated above, "?" denotes non-deterministic values.

Note, the transition (update) relation for each localized shared variable depends on other local variables, thereby, making the model independent (i.e., decoupled). However, due to non-deterministic read values, the model has additional behaviors, hence, it is an abstract model.

In the second phase, the goal is to remove imprecision due to the abstraction. In this phase, the constraints are added to restrict the introduced non-determinism and to capture the interleavings needed to verify correctness. More specifically, for each pair of shared access state (in different threads), token-passing constraints are added from the write_sync node of a shared access to the read_sync node of the other shared access. Intuitively, these token-passing constraints permit passing of the token from one thread to another, giving a total order in the shared accesses. Furthermore, these constraints permit synchronization of values of the localized shared variables from one thread to another. Together, the token-passing constraints captures all and only the interleavings needed to verify correctness that are sequentially consistent. It can be shown that the token-based model is both complete in that it allows only sequentially consistent traces and sound in that it captures all interleaving needed to verify correctness for a bounded unrolling of threads. Further, it can also be shown that the size of pair-wise constraints added grow quadratically (in the worse case) with the unrolling depth.

With reference again to FIG. 2, a token-passing constraint 208 is shown as a directed edge from a write_sync ws node of one thread to a read_sync rs node of another. These constraints are added for all pairs of ws and rs nodes. A synchronization constraint from $M_1$ to $M_2$ will include $x_2=x_1 \wedge y_2=y_1 \wedge z_2=z_1 \wedge tk_2=1 \wedge tk_1=0 \wedge ctk_2=ctk_1$, where token-passing is enforced by assertion/de-assertion of a corresponding token variable. As noted above, $v_i$ is localized variable in $M_i$ corresponding to shared variable v. As shown, 4*4*2=32 such token-passing constraints are added for this example.

Although the above approach captures all and only interleavings needed to verify correctness, it also allows interleavings that may be redundant (i.e. equivalent). For example, the interleaving $\sigma_1 \equiv 1b \cdot 2b \cdot 1a \cdot 3b \cdot 4b \cdot 2a \cdot 3a \cdot 4a$, and $\sigma_2 \equiv 1a \cdot 2a \cdot 1b \cdot 3a \cdot 3b \cdot 4b \cdot 4a$, are equivalent, as, in these interleavings, the conflicting pairs (2b, 3a), (1a, 4b), (4b, 4a) are in the same happens-before order, besides the thread program order pairs. "·" denotes concatenation. The token-based approach will explore both the interleavings.

As discussed further herein below, using mutually atomic transactions, the token-passing model is built upon to identify pair-wise constraints that can be safely removed, without affecting soundness and completeness, and guarantee optimality by removing all redundant interleavings. For the example, with reference to FIG. 2, employing MATs in accordance with exemplary features of the present invention permits the removal of 24 such pair-wise constraints. At the same time, all the interleavings needed to verify correctness are covered with no redundancy. To illustrate, using MATs permits retention of $\sigma_1$ and does not retain any other interleavings, such as $\sigma_2$, equivalent to $\sigma_1$. The choice of a representative interleaving will depend on a given thread prioritization, as discussed further below.

Mutually Atomic Transactions

As noted above, exemplary embodiments of the present invention are based on the concept of mutually atomic transactions. Intuitively, let a transaction be a sequence of statements in a thread. Two transactions $tr_i$ and $tr_j$ of threads $M_i$ and $M_j$, respectively, are mutually atomic transactions if and only if there exists exactly one conflicting shared access pair between them, and the statements comprising the shared-access pair is the last one in each of the transactions. A more formal definition is presented below.

Figure 3:
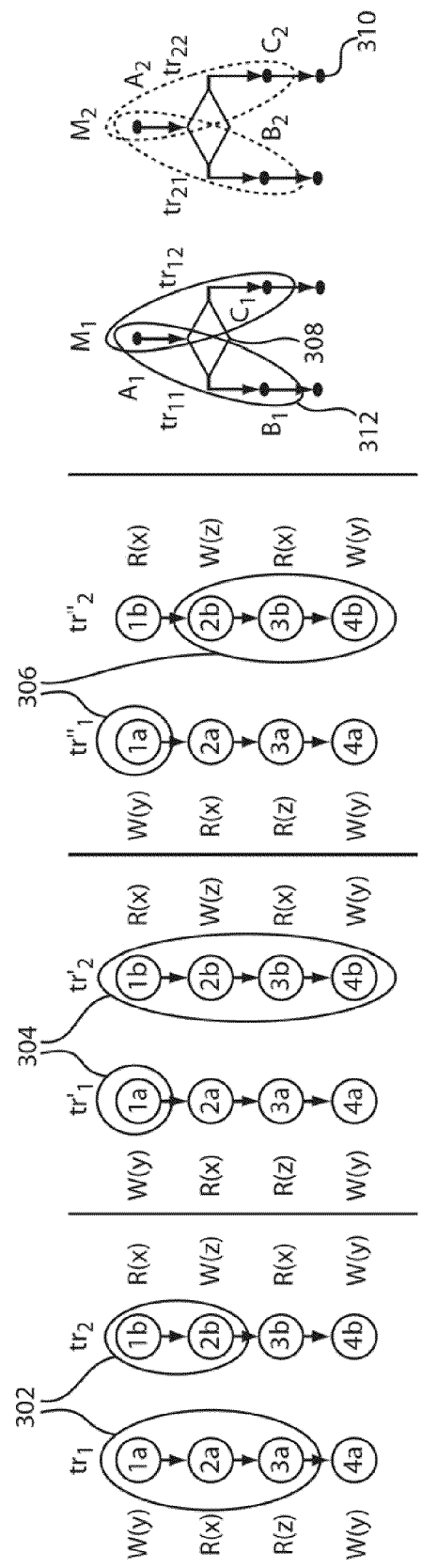
FIGS. 3A-D are control flow graphs illustrating mutually atomic transactions for two concurrent program threads in accordance with one exemplary aspect of the present invention.

The concept of a MAT is illustrated in an example shown in FIGS. 3A-D. From the control state pair (1a, 1b), there are two reachable control states with conflicting accesses, i.e., (3a, 2b) and (1a, 4b), as shown in FIGS. 3A and 3B. Corresponding to that there are two MATs 302 and 304, $m=(tr_1=1a \ldots 3a, tr_2=1b \ldots 2b)$ in FIG. 3A and $m'=(tr'_1=1a, tr'_2=1b \ldots 4b)$ in FIG. 3B, respectively. Similarly, from (1a, 2b) in FIG. 3C we have MAT 306, $m''=(tr''_1=1a, tr''_2=2b \ldots 4b)$. In general, there could be multiple possible MATs for these examples.

In a more general setting with conditional branching, MATs may be identified by exploring beyond conditional branches, as illustrated in FIG. 3D, with a conditional branch denoted as a diamond node 308, and control states $A_i, B_i, C_i$ denoted as dark ovals 310. Starting from $(A_1, A_2)$, the following control path segments are obtained: $tr_{11}=A_1 \ldots B_1$, $tr_{12} = A_1 \ldots C_1$, $tr_{21} = A_2 \ldots B_2$, and $tr_{22} = A_2 \ldots C_2$, shown as ovals 312. For each of the four combinations of $tr_{1i}$, $tr_{2j}$, MAT is defined separately.

Given a MAT ($tr_i$, $tr_j$), there are only two equivalent classes of interleavings. One class is represented by $tr_i \cdot tr_j$, i.e., $tr_i$ executing before $tr_j$ and the other class is represented by $tr_j \cdot tr_i$, i.e., $tr_j$ executing before $tr_i$. "·" represents a concatenation. For a given MAT $m = (tr_1, tr_2)$ shown in FIG. 3A, the interleavings $\sigma_1 \equiv 1a \cdot 2a \cdot 3a \cdot 1b \cdot 2b$ and $\sigma_2 \equiv 1b \cdot 2b \cdot 1a \cdot 2a \cdot 3a$ represent the two equivalent classes, respectively. In other words, given a MAT, the associated transactions can be considered atomic pair-wise, and one can avoid interleaving them in-between. In general, transactions associated with different MATs may not be atomic. For example, $tr_1$ of FIG. 3A is not atomic with $tr_2$" of FIG. 3C.

Intuitively, it would be desirable to have a set of MATs such that, by adding token-passing constraints only between MATs, any interleavings needed to verify correctness are not missed and all redundant interleavings are removed. Such an algorithm, GenMAT, is described below with respect to Table 1. GenMAT may be employed to compute an optimal and adequate set of MATs. For the example provided in FIGS. 3A-D, one such set is {(1a . . . 3a,1b . . . 2b),(4a,1b . . . 4b),(1a,3b . . . 4b),(4a,3b . . . 4b),(2a . . . 4a,3b . . . 4b)}. Based on the set, only 8 token-passing constraints are added as compared to 32, which are added in accordance with the token passing model of FIG. 2.

It should be noted that the MAT-based approach guarantees optimality. In addition to obtaining an optimal reduction in the state space, the MAT-based approach goes further in reducing problems sizes than previous approaches. The MAT-based approach obtains state space reduction by removing constraints (i.e., adding fewer token-passing constraints), while other, previous, symbolic approaches obtain it by adding more constraints (i.e., constraining the scheduler). Experimentally, the MAT-based approach was observed to be an order-of-magnitude more memory efficient compared to previous approaches. Further, the MAT-based approach is orthogonal to previous approaches that exploit transaction based reductions. Nevertheless, transaction based reductions can be exploited to identify unreachable conflicting pairs in the MAT-based approach and further reduce the token-passing constraints needed to verify correctness.

Formal Definitions

Turning now to a more formal description of the MAT-based approach in accordance with exemplary implementations of the present invention, a multi-threaded system CS comprising a finite number of deterministic bounded-stack threads communicating with shared variables, some of which are used as synchronization objects such as locks, is considered. Let $M_i (1 \leq i \leq N)$ be a thread model represented by a control and data flow graph of the sequential program it executes. Let $T_i$ represent the set of 4-tuple transitions (c,g,u,c') of thread $M_i$ where c,c' represent the control states, g is a Boolean-valued enabling condition (or guard) on program variables, and u is an update function on program variables. Let $\mathcal{T} = \cup_i T_i$ be the set of all transitions. Let $V_i$ be set of local variables in $T_i$ and $\mathcal{V}$ be the set of (global) shared variables. Let S be the set of global states of the system, and states $s \in S$ are a valuation of all local and global variables of the system. A global transition system for CS is an interleaved composition of the individual thread models, $M_i$. Each transition comprises global firing of a local transition $t_i = (a_i, g_i, u_i, b_i) \in \mathcal{T}$. If the enabling predicate $g_i$ evaluates to true in s, $t_i$ is "enabled."

The notion of a run of a multi-threaded program is defined as an observation of events such as global accesses, thread creations and thread termination. If the events are ordered, it is referred to as a total order run. We define a set $A_i$ of shared accesses corresponding to a read $R_i(x)$ and a write $W_i(x)$ of a thread $M_i$ where $x \in V$. For $a_i \in A_i$, $var(a_i)$ is used to denote the accessed shared variable. $\vdash_i$ is used to denote the beginning and $\dashv_i$ is used to denote the termination of thread $M_i$, respectively. The alphabets of events of thread $M_i$ is a set $\Sigma_i = A_i \cup \{\vdash_i, \dashv_i\}$. $\Sigma = \cup_i \Sigma_i$ is used to denote a set of all events. A word $\sigma$ defined over the alphabet set $\Sigma$, i.e., $\sigma \in \Sigma^*$ is a string of alphabet from $\Sigma$, with $\sigma[i]$ denoting the $i^{th}$ access in $\sigma$ and $\sigma[i,j]$ denoting the access substring from $i^{th}$ to $j^{th}$ position, i.e., $\sigma[i] \ldots \sigma[j]$, where "·" denotes concatenation. $|\sigma|$ denotes the length of the word $\sigma$. $\pi(\sigma)$ is used to denote a permutation of alphabets in the word $\sigma$. $\sigma|_i$ is used to denote the projection of $\sigma$ on thread $M_i$, i.e., inclusion of the actions of $M_i$ only. Some definitions of terms applied herein are provided below to aid in understanding of exemplary embodiments of the present invention:

Transaction:

A transaction is a word $$tr_i \in \Sigma_i^*$$

that may be atomic with respect to one or more other transactions. Atomic is understood to mean that the transaction is uninterrupted by another thread. If the transaction is atomic with respect to all other thread transactions, it referred to an as independent transaction.

Schedule:

Informally, a schedule is defined as a total order run of a multi-threaded program where the accesses of the threads are interleaved. Formally, a schedule is a word $\sigma \in \Sigma^*$ such that $\sigma|_i$ is a prefix of the word $\vdash_i \cdot A_i^* \cdot \dashv_i$.

Happens-Before Relation ($\prec, \preceq$):

Given a schedule $\sigma$, e happens-before e', denoted as $e \prec_\sigma e'$ if $i < j$, where $\sigma[i] = e$ and $\sigma[j] = e'$. The subscript is dropped if it is obvious from the context. Also, if the relation is not strict, the notation $\preceq$ is used. If e, $e' \in \Sigma_i$ and e precedes e' in $\sigma$, then they are in a thread program order, denoted as $e \prec_{po} e'$.

Sequentially Consistent:

A schedule $\sigma$ is sequentially consistent iff: (a) $\sigma|_i$ is in thread program order, (b) each shared read access gets the last data written at the same address location in the total order, and (c) synchronization semantics are maintained, i.e., the same locks are not acquired in the run without a corresponding release in between. Only schedules (and their permutations) that are sequentially consistent are considered.

Conflicting Access:

A pair $a_i \in A_i$, $a_j \in A_j$, $i \neq j$ is defined as conflicting if they are accesses on the same shared variable (i.e., $var(a_i) = var(a_j)$) and one of them is a write access. $C_{ij}$ is used to denote the set of tuples ($a_i$, $a_j$) of such conflicting accesses. $Sh_{ij}$ is used to denote a set of shared variables—between $M_i$ and $M_j$ threads—with at least one conflicting access, i.e., $Sh_{ij} = \{var(a_i) | (a_i, a_j) \in C_{ij}\}$. $Sh_i$ is defined as a set of variables shared between $M_i$ and $M_k$, $k \neq i$ with at least one conflicting access, $Sh_i = \cup_{i \neq j} Sh_{ij}$. In general, $Sh_{ij} \subseteq (Sh_i \cap Sh_j)$.

Dependency Relation (D):

A relation $D \subseteq \Sigma \times \Sigma$ is a dependency relation iff for all (e, e') $\in D$, one of the following holds: (1) e, $e' \in \Sigma_i$ and $e \prec_{po} e'$, (2) (e, e') $\in C_{ij}$, (3) $e = \dashv_i$, $e' = \dashv_j$ for $i \neq j$. The last condition is needed when the order of thread termination is important. If (e, e') $\notin D$, the events e, e' are deemed independent. The dependency relation, in general, is difficult to obtain; however, one can obtain such relation conservatively using static analysis, which may result in a larger dependency set than needed. For the reduction analysis employed herein, it may assumed that such a relation is provided; the optimality and adequacy results may be based on the accuracy of such a relation.

Equivalency Relation (~):

Two schedules $\sigma_1 = w \cdot e \cdot e' \cdot v$ and $\sigma_2 = w \cdot e' \cdot e \cdot v$ are equivalent (Mazurkiewicz's trace theory), denoted as $\sigma_1 \sim \sigma_2$, if $(e, e') \in D$. An equivalent class of schedules can be obtained by iteratively swapping the consecutive independent events in a given schedule. Final values of both local and shared variables remain unchanged when two equivalent schedules are executed.

A partial order is a relation $R \subseteq \Sigma \times \Sigma$ on a set $\Sigma$, that is reflexive, antisymmetric, and transitive. A partial order is also a total order if, for all $e, e' \in \Sigma$, either $(e, e') \in R$ or $(e', e) \in R$. Partial order-based reduction (POR) methods avoid exploring all possible interleavings of shared access events. If $(e, e') \in D$, all equivalent schedules agree on either $e \prec e'$ or $e' \prec e$, but not both.

Mutually Atomic Transactions:

Two transactions $tr_i$ and $tr_j$ of threads $M_i$ and $M_j$, respectively, are mutually atomic iff, except for the last pair, all other event pairs in the corresponding transactions are independent. Formally, a Mutually Atomic Transactions (MAT) is a pair of transactions:

$(tr_i, tr_j), i \neq j$ iff $\forall k1 \leq k \leq |tr_i|, \forall h1 \leq h \leq |tr_j|, (tr_i[k], tr_j[h]) \notin D$
$(k \neq |tr_i|$ and $h \neq |tr_j|)$, and $tr_i[|tr_i|], tr_j[|tr_j|] \in D$.

Given a MAT $(tr_i, tr_j)$, an interesting observation, as noted earlier, is that a word $\bar{w} = tr_i \cdot tr_j$ is equivalent to any word $\pi(w)$ obtained by swapping any consecutive events $tr_i[k]$ and $tr_j[h]$ such that $k \neq |tr_i|$ and $h \neq |tr_j|$. Similarly, the word $w' = tr_j \cdot tr_i$ is equivalent to any word $\pi(w')$ obtained as above. Note, $w \not\sim w'$. Therefore, for a given MAT, there are only two equivalent classes, represented by $w$ and $w'$. In other words, given a MAT, the associated transactions are atomic pair-wise.

Exemplary Token Passing Model Using MAT

In accordance with exemplary implementations of the present invention, partial order reduction techniques employing MATs and aspects of token passing modeling may be used to reduce verification conditions, both in size and state space for concurrent systems. The MAT-based reduction embodiments disclosed herein are both adequate, in that they preserve all and only the interleavings needed to verify correctness, and optimal, in that no redundant interleaving, as determined statically, are retained for a bounded depth analysis. Moreover, approaches using MAT can outperform other approaches by orders of magnitude, both in performance and size of the verification problems.

According to exemplary aspects of the present invention, the pair-wise atomicity of MATs in a token-based model may be exploited as follows: Let $c(e)$ represent the control state of the thread where the corresponding event $e$ occurs. For the given MAT $(tr_i = f_i \ldots l_i, tr_j = f_j \ldots l_j)$, token-passing constraints are added only from $c(l_j)$ to $c(f_i)$, and $c(l_i)$ to $c(f_j)$, respectively. As discussed above with respect to the token passing model, such constraints are added between corresponding pre- and post-access blocks.

Regarding adequacy of MATs, given a schedule $$\sigma = w_1^1 \ldots w_N^1 \ldots w_1^n \cdot w_N^n, w_i^k \in \Sigma_i^*, 1 \leq k \leq n, 1 \leq i \leq N.$$

A set of ordered pairs CSP is defined as follows: $CSP(\sigma) = \{(l_i^k, f_{i'}^{k'}) | 1 \leq i, i' \leq N, 1 \leq k, k' \leq n\}$ where $f_i^k$ and $l_i^k$ denote the first and last accesses of $w_i^k$; and $w_{i'}^{k'}$ is a non-empty word adjacent right of $w_i^k$. To obtain the schedule, $CSP(\sigma)$ captures the interleaving pairs needed to verify correctness. In other words if token passing constraints are added between every pair of control states $(a, b) \in CSP(\sigma)$, the schedule $\sigma$ is allowed. For a given MAT $\alpha = (f_i \ldots l_i, f_j \ldots l_j)$, a set of interleaving ordered pairs are defined, $TP(\alpha) = \{(l_i, f_j), (l_j, f_i)\}$.

Given a set of $\mathcal{MAT}_{ij}$, $TP(\mathcal{MAT}_{ij}) = \bigcup_{\alpha \in \mathcal{MAT}_{ij}} TP(\alpha)$ is defined and denoted as $TP_{ij}$. A token-passing pairs set TP is adequate iff for every schedule $\sigma$ in the multi-threaded system, $CSP(\sigma) \subseteq TP$. A set $\mathcal{MAT}$ is adequate iff TP is adequate. It should be noted that the size of TP is upper bounded by a quadratic number of pair-wise accesses. A procedure "GenMAT," discussed in more detail below, can be used to obtain a set of $\mathcal{MAT}_{ij}$. If $Sh_{ij} \subsetneq Sh_i \cup Sh_j$, procedure GenExtraTP, also discussed further below, can be used to generate an extra token-passing pairs set $TP_{ij}'$ from $\mathcal{MAT}_{ij}$. Thus, the adequate set TP may be constructed as $(\bigcup_{i \neq j} TP_{ij}) \cup (\bigcup_{i \neq j} TP_{ij}')$.

Figure 4:
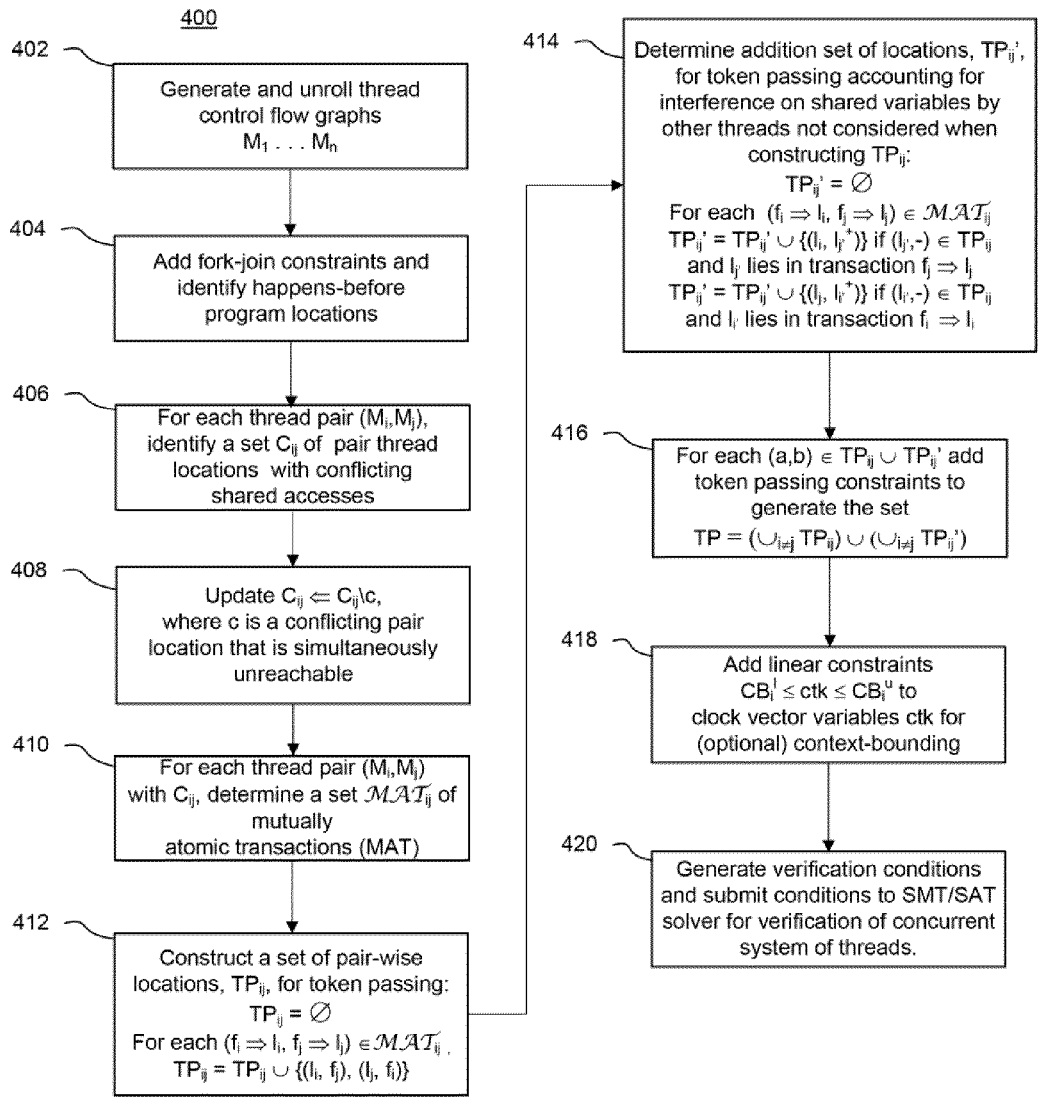
FIG. 4 is a block/flow diagram of a method for generating verification conditions using mutually atomic transactions in accordance with one exemplary embodiment of the present invention.

With reference now to FIG. 4, a method 400 for reducing verification conditions for a multi-threaded concurrent system using mutually atomic transactions in accordance with one exemplary embodiment of the present invention is illustrated. Here, MATs are employed in a token-passing model to selectively add token-passing constraints.

Method 400 may begin at step 402 in which, given a set of interacting concurrent program threads $M_1 \ldots M_n$, communicating using shared variables and synchronization primitives, each thread model may be generated and unrolled or decoupled independently, where each thread model is a sound abstraction of the corresponding thread. Here, in this particular embodiment, control flow graphs representing individual threads are generated.

At step 404, fork-join constraints are added and happens-before program locations between conflicting accesses are identified from the program structure. Here, fork-join is used to derive the happens-before relations.

At step 406, for each thread pair $(M_i, M_j)$ a set of pair (thread) control locations $C_{ij}$ with conflicting shared accesses is identified. Shared accesses that are in conflict are accesses on the same variable. For each of the two-thread pairs, an additional constraint that one of the accesses is a write is added.

At step 408, from the set $C_{ij}$, the system may identify pairs that are unreachable simultaneously due to i) happens-before relations, such as before and after fork/join; ii) mutual exclusions and/or iii) lock acquisition patterns. Thus, $C_{ij}$ is updated, $C_{ij} \Leftarrow C_{ij} \setminus c$, where $c$ is a conflicting pair location that is simultaneously unreachable.

At step 410, for each thread pairs $M_i, M_j$, and corresponding set $C_{ij}$, a set $\mathcal{MAT}_{ij}$ of mutually atomic transactions are determined. Each MAT $m \in \mathcal{MAT}_{ij}$ is represented as $(f_i \Rightarrow l_i, f_j \Rightarrow l_j)$ where $f_i \Rightarrow l_i$ denotes an atomic transition from location $f_i$ to $l_i$ in thread $M_i$, and $f_j \Rightarrow l_j$ denotes the atomic transition from location $f_j$ to $l_j$ in thread $M_j$, such that there is no conflict access other than at locations $l_i$ and $l_j$, and all the transitions may not be disabled simultaneously. Identification of MATs is described in more detail below with respect to FIGS. 5 and 6.

At step 412, a set of pair wise locations, $TP_{ij}$, for token passing is determined based on the set $\mathcal{MAT}_{ij}$ of mutually atomic transactions. $TP_{ij}$ may be constructed using GenMAT, discussed in more detail below. For example, a set $TP_{ij}$ of pair-wise locations for token passing can be obtained as follows: for each MAT $m \equiv (f_i \Rightarrow l_i, f_j \Rightarrow l_j) \in \mathcal{MAT}_{ij}$, a set $TP_{ij}$ is constructed with $(l_i, f_j)$ and $(l_j, f_i)$ location pairs indicating that a token may be passed from $l_i$ to $f_j$ and from $l_j$ to $f_i$. Thus, $TP_{ij} = TP_{ij} \cup \{(l_i, f_j), (l_j, f_i)\}$ At step 414, an additional set of locations, $TP_{ij}'$, accounting for interference on shared variables by other threads not considered when constructing $TP_{ij}$, is also determined for token passing. $TP_{ij}'$ may be constructed using GenExtraTP, discussed in more detail below. The additional set of locations $TP_{ij}'$ for token passing is obtained as follows: for each MAT $(f_i \Rightarrow l_i, f_j \Rightarrow l_j) \in \mathcal{MAT}_{ij}$, we update the $TP_{ij}'$ set with $(l_i, l_{j'}{}^+)$ if $(l_{j'},-) \in TP_{ij}$ and $l_{j'}$ lies in transaction $f_j \Rightarrow l_j$. Similarly, the $TP_{ij}'$ set is also updated with $(l_{j'},l_i{}^+)$ if $(l_i,-) \in TP_{ij}$ and $l_i$ lies in transaction $f_i \Rightarrow l_i$. It should be understood that $t^+$ denotes the next program thread location after location t. Here, $l_j{}^+$ and $l_i{}^+d$ correspond to program thread locations that conflict with thread locations of one or more threads other than threads $M_i$ and $M_j$.

At step 416, for each pair location (a,b) in $TP_{ij} \cup TP_{ij}'$, token passing constraints are added to generate the set $TP = (\cup_{i \neq j} TP_{ij}) \cup (\cup_{i \neq j} TP_{ij}')$. As noted above, the token passing model may be built by first generating decoupled (unrolled) thread models. Thereafter, for each ordered pair $(a,b) \in TP$, token passing constraints between (a,b), which denotes that a token may be passed from a to b, are added.

Optionally, at step 418, linear constraints $CB_i^l \leq ctk \leq CB_i^u$ may be added to bound the number of times a token could be passed to a specific thread model $M_i$, with $CB_i^l$ and $CB_i^u$ corresponding to user-provided lower and upper context-bounds respectively. Different context-switching bounds may be selectively chosen for different threads.

At step 420, verification conditions may be generated and submitted to an SMT/SAT solver for verification of the concurrent system of threads. The verification conditions may comprise transition relations of each thread model, token-passing constraints, context-bounding constraints (optionally), and environmental assumptions and negated property constraints. These constraints are expressed in a quantifier-free formula and passed to a SMT/SAT solver for a satisfiability check.

It should be noted that, as opposed to performing steps 410-416, in which MATs are employed to determine and generate token passing constraints, the previous token passing model discussed above obtains an ordered set of token-passing pairs TP by considering every pair of control states in $C_i \times C_j$, where $C_i$ and $C_j$ consist of control states of thread $M_i$ and $M_j$ that have some conflicting access, respectively. In contrast, in accordance with exemplary aspects of the present invention, the state space explored may be significantly reduced by employing MATs and adding fewer token passing constraints while preserving all token passing constraints needed to verify the system, as discussed above.

Generating MATs

Figure 5:
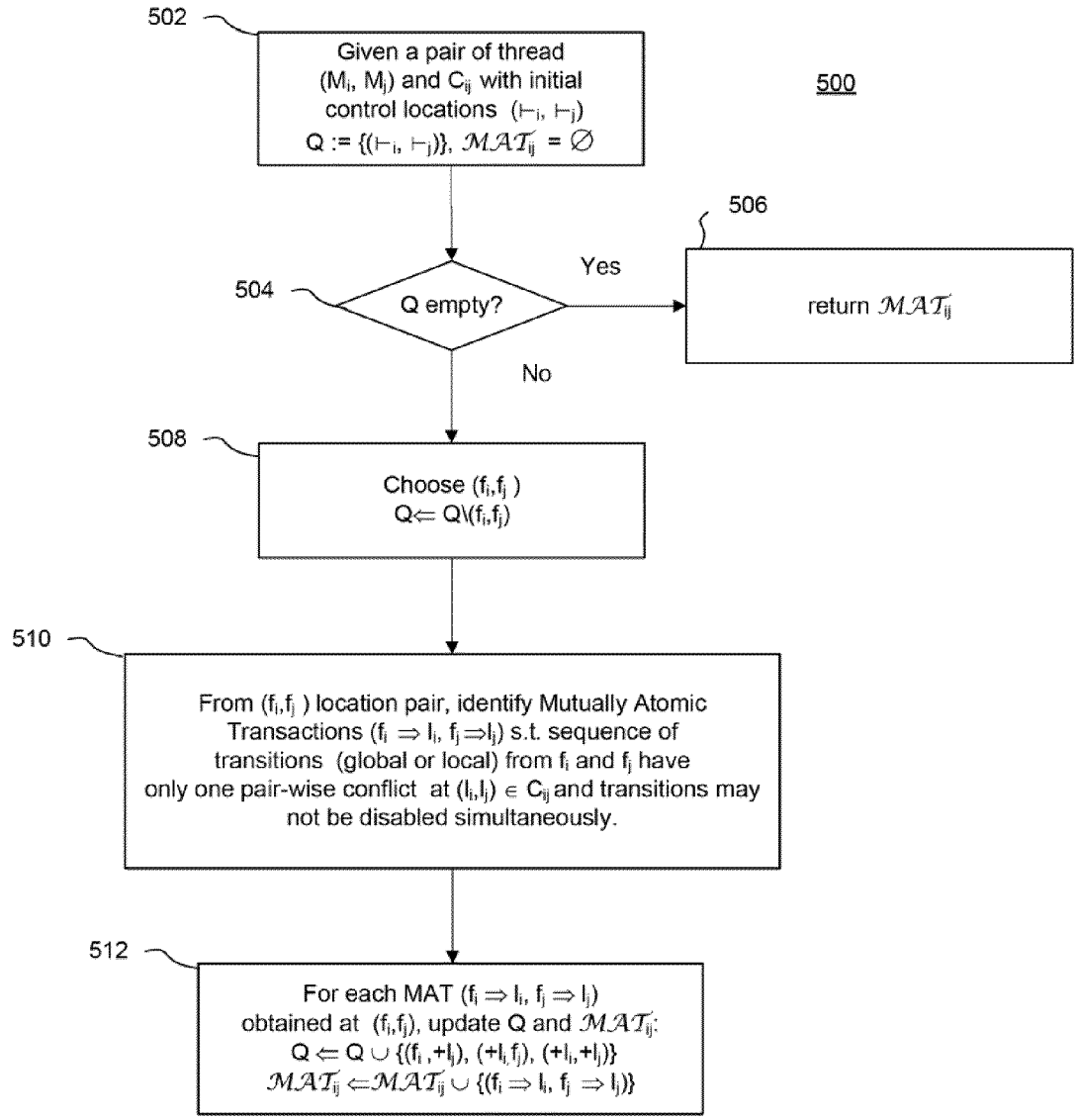
FIG. 5 is a block/flow diagram of a method for determining a set of mutually atomic transactions for a pair of concurrent program threads in accordance with one exemplary embodiment of the present invention.

With reference now to FIG. 5 and Algorithm 1 of Table 1 with continuing reference to FIG. 4, a more specific description of generating MATs in accordance with exemplary aspects of the present invention is provided. Method 500 and Algorithm 1 may be performed to implement step 410 of method 400. Prior to discussing method 500 and Algorithm 1, a description of the notations used is provided for ease of readability. When there is no ambiguity, $e_i$ is used to also indicate $c(e_i)$, the control state of thread $M_i$ where the access event $e_i$ belongs. Further, $+e_i$ is used to denote the event immediately after $e_i$ in program order, i.e., $c(+e_i)=next(c(e_i))$. Similarly, $-e_i$ is used to denote the event immediately preceding $e_i$, i.e., $c(-e_i)=next(c(-e_i))$. At times, tuple (a, b) is referred to as a pair.

TABLE 1

Algorithm 1 GenMAT: Obtain a set of MATs
1: input: Unrolled Thread Models: $M_i, M_j$; Dependency Relation D
2: output: $\mathcal{MAT}_{ij}$.
3: $\mathcal{MAT}_{ij} = \emptyset$; Q:= $\{(\vdash_i, \vdash_j)\}$; Q' := $\emptyset$ {Initialize Queue};
4: while Q ≠ Q' do
5:   Select $(f_i, f_j) \in Q \backslash Q'$
6:   $Q:=Q\backslash\{(f_i,f_j)\}; Q':=Q'\cup\{(f_i,f_j)\}$
7:   MAT-candidates set, $\mathcal{M}_c = \{m'|m' = (tr'_i=f_i...l'_i,tr'_j=f_j...l'_j)\text{is MAT}\}$,
8:   Select a MAT m = $(tr_i=f_i...l_i,tr_j=f_j...l_j) \in \mathcal{M}_c$ such that
       $\forall_{m' \in M_c, m' \neq m} l_j^{\prec}{}_{pol}l'_j$, (i.e., $M_j$ has higher priority).
9:   $\mathcal{MAT}_{ij} := \mathcal{MAT}_{ij} \cup \{m\}$
10:  if $(l_i = \neg \wedge l_j = \neg_j)$ then continue;
11:  elseif $(l_i = \neg_i)$ then q := $\{(f_i, +l_j)\}$;
12:  elseif $(l_j = \neg_j)$ then q := $\{(+l_i, f_j)\}$;
13:  else q := $\{(+l_i, +l_j), (+l_i, f_j), (f_i, +l_j)\}$;
14:  Q: = Q∪q;
15: end while
16: return $\mathcal{MAT}_{ij}$ A simple procedure, GenMAT, Algorithm 1, generally described in method 500, is provided for generating $\mathcal{MAT}_{ij}$, given a pair of unrolled threads $M_i$ and $M_j$ and dependency relation D. For ease of explanation, it is assumed that the threads are unrolled for some bounded depth, and there is no conditional branching.

Method 500 may begin at step 502 in which, for a given thread pair $M_i$ and $M_j$ and corresponding conflict location set $C_{ij}$, a queue Q is first initialized with control state pair $(\vdash_i, \vdash_j)$ representing the beginning of the threads, respectively. Initialization of Q, for example, is shown at step 3 of Algorithm 1.

At step 504, it may be determined whether Q is empty. If Q is empty, then the existing MAT set $\mathcal{MAT}_{ij}$ is returned at step 506. Otherwise, the method proceeds to step 508.

At step 508, a random pair location from Q, $(f_i, f_j)$, is chosen, as shown, for example, in steps 5 and 6 of Algorithm 1.

At step 510, from the chosen location $(f_i, f_j)$, a pair-mutually atomic transaction $(f_i \Rightarrow l_i, f_j \Rightarrow l_j)$ is identified. In other words, it is determined that there exists a sequence of transitions from $f_i$ to $l_i$ and $f_j$ to $l_j$ such that there is only one pair-wise conflict at $(l_i, l_j) \in C_{ij}$. Further, it should be understood that the transitions from $f_i \Rightarrow l_i$ and $f_j \Rightarrow_j$ may not be disabled. If the transitions are disabled, then the conflict is ignored and another MAT from $(f_i, f_j)$ is sought out. For the two-thread case, to check if the transitions are disabled, it is sufficient to check if the conditions for transitions are disjoint. However, for more than 2 threads, whether the disjoint condition can potentially be modified by another thread, i.e. there is Write conflict on the conditional variable, should also be checked.

For example, for any pair $(f_i, f_j)$ in the Q, representing the current control pair locations, a MAT $m'=(tr'_i,tr'_j)$ may be obtained as follows: $tr'_i$ and $tr'_j$ are started from $f_i$ and $f_j$, respectively, and ended at $l'_i$ and $l'_j$ respectively, such that $(l'_i/l'_j) \in D$, and there is no other conflicting pair in-between. There may be many MAT candidates m'. Let $\mathcal{M}_c$ denote a set of such choices. As shown in steps 7-9 of Algorithm 1, $m \in \mathcal{M}_c$ may be uniquely selected by assigning thread priorities and using the following selection rule: If a thread $M_j$ is given higher priority over $M_i$, $m=(tr_i=f_i \ldots l_i,tr_j=f_j \ldots l_j)$ is preferred over $m'=(tr'_i=f_i \ldots l'_i,tr'_j=f_j \ldots l'_j)$ if $l_j \prec_{po} l'_j$. The choice of $M_j$ over $M_i$ is arbitrary, but is needed for the optimality result. In steps 7-9, Algorithm 1 presents MAT selection in a declarative style for ease of understanding. However, it should be understood that the unique MAT is found using the selection rule, without constructing the set $\mathcal{M}_c$. It can be shown that GenMAT can always find such a unique MAT with the chosen priority.

At step 512, $MAT_{ij}$ is updated with each m or $(f_i \Rightarrow l_j, f_j \Rightarrow l_j)$, $\mathcal{MAT}_{ij} \Leftarrow \mathcal{MAT}_{ij} \cup \{(f_i \Rightarrow l_j, f_j \Rightarrow l_j)\}$ as shown, for example, in step 10 of Algorithm 1. In addition, if $(l_j \neq \neg l_i)$ and $(l_j \neq \neg l_j)$, Q, is updated with three pairs, i.e., $Q \Leftarrow Q \cup \{(f_i, +l_j), (+l_i, f_j), (+l_i, +l_j)\}$; otherwise, we insert selectively as shown in steps 11-15 Algorithm 1. The loop at steps 504-512 is continued until Q is empty.

Example

Figure 6:
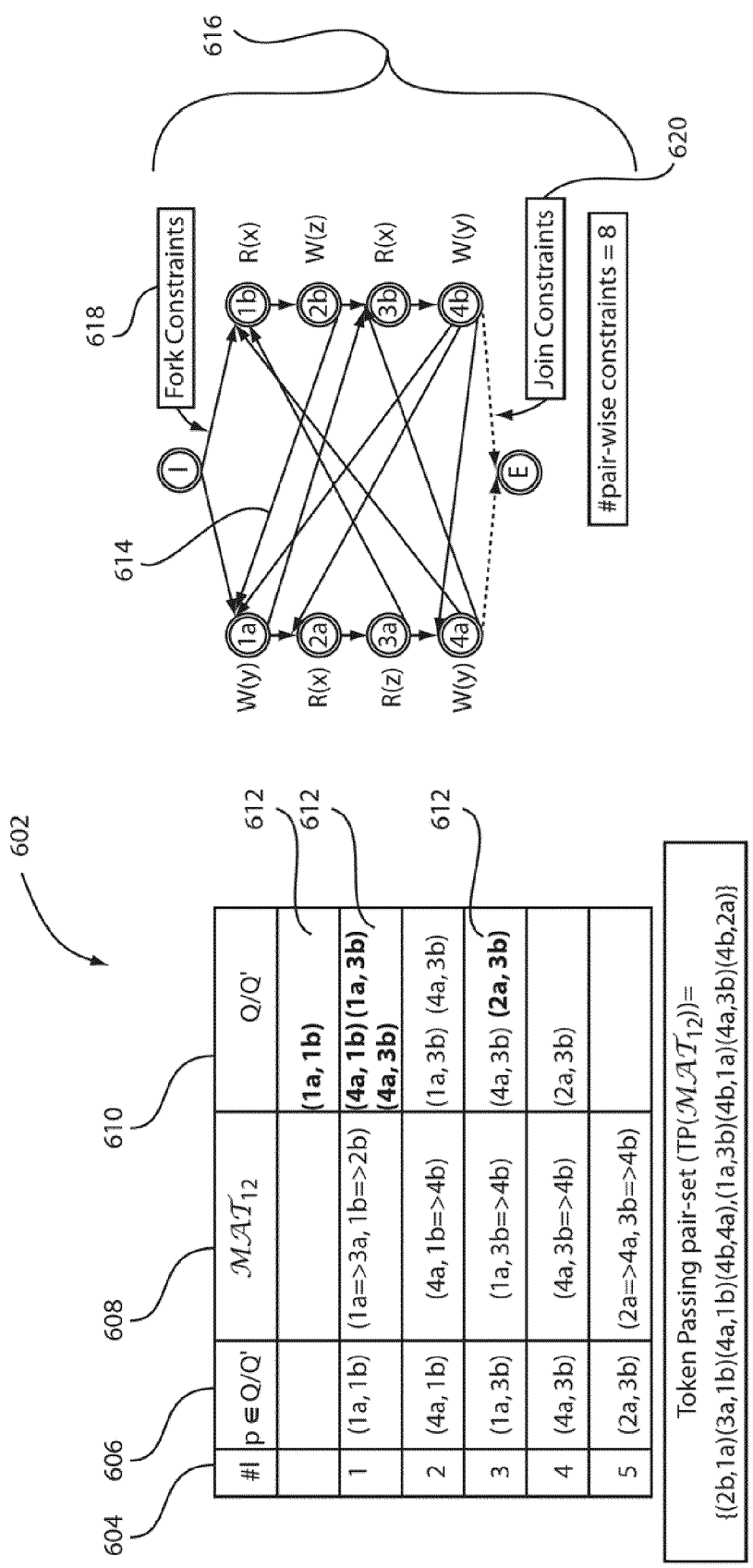
FIG. 6 includes a control flow diagram and a table illustrating token passing constraints for two concurrent program threads determined by using mutually atomic transactions in accordance with one exemplary embodiment of the present invention.

With reference now to FIG. 6 with continuing reference to FIGS. 1, 2 and 3A-B, a run of GenMAT is presented in FIG. 6 for the example provided in FIG. 1. $M_2$ is given a higher priority over $M_1$. The table 602 columns provide each iteration step (#I) 604, the pair $p \in Q \setminus Q'$ selected 606, the chosen $MAT_{12}$ 608, and the new pairs added in $Q \setminus Q'$ 610. Token-passing constraints 614 (shown as directed edges) are added in the graph 616 between every ordered pair in the set $TP(MAT_{12})$. Total number of pair-wise constraints added is 8, much less compared with all pair-wise constraints, as shown in FIG. 1. The fork constraints 618 and join constraints 620, shown as dotted edges, provide happens-before ordering between the accesses. In the first iteration of the run, out of the two MAT candidates m=(1a . . . 3a,1b . . . 2b) and m'=(1a, 1b . . . 4b), also shown in FIGS. 3A-B, GenMAT selects m, as $M_2$ is given higher priority over $M_1$ and $2b \prec_{po} 4b$.

It can be shown that the pair-wise constraints obtained using Method 500 and Algorithm 1 are adequate in that they encompass all token passes needed to verify the correctness of the system and are optimal in that they do not allow two equivalent schedules. Further, it can also be shown that the algorithm GenMAT terminates.

Additional Token-Passing Constraints for Multi-Threaded System

As mentioned above with respect to step 414 of FIG. 4, additional token passing constraints for $TP_{ij}'$ should be added to account for interference on shared variables by other threads not considered when constructing $TP_{ij}$. It can be shown that for a thread pair $M_i$, $M_j$ if $Sh_{ij} \subsetneq (Sh_i \cup Sh_j)$ holds, then the set $\cup_{i \neq j} TP_{ij}$ is not adequate. This can happen for a schedule if a token passes from $M_i$ or $M_j$ to a conflicting access in another thread $k \neq i,j$ on a shared variable $v \in (Sh_i \cup Sh_j) \setminus Sh_{ij}$. We illustrate it with the following example.

Figure 7:
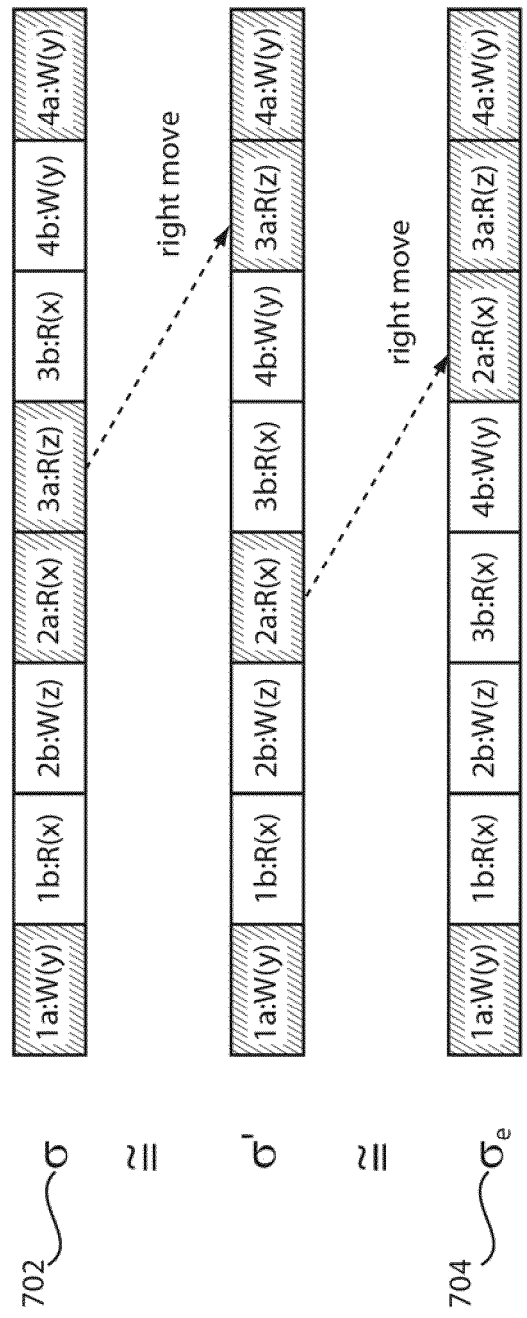
FIG. 7 is a diagram of equivalent schedules for use of shared variables by concurrent program threads illustrating the token passing constraints needed to verify the correctness of a corresponding concurrent system.

For example, consider a three-threaded system with threads $M_a, M_b$, and $M_c$ communicating with shared variables x, y, and z as shown in FIG. 7, and the corresponding pair-wise token-passing sets $TP_{ab}, TP_{bc}$, and $TP_{ac}$ computed using the GenMAT procedure. Consider a schedule $\sigma$ 702 as shown in FIG. 7. An equivalent schedule $\sigma_e$ 704 can be obtained by performing right moves 706. It can be verified that the schedule $\sigma_e$ cannot be captured by the computed sets due to missing token-passing pairs such as (3a, 2b). This non-adequacy arises from the following observation: As $y \notin Sh_{ab}$, the procedure GenMAT ignores any interference on such variables by the thread $M_c$ while considering threads $M_a$ and $M_b$. Therefore, the token passing pair (3a, 2b) is not added in $TP_{ab}$ while considering the MAT $(2a \Rightarrow 3a, 1b \Rightarrow 3b)$, although (1b, 1c) is added in $TP_{bc}$ as $y \in Sh_{bc}$.

To overcome that scenario, the following process, GenExtraTP, mentioned above, may be employed. GenExtraTP uses $MAT_{ij}$ to generate $TP_{ij}'$ by adding token-passing pairs for such cases:

$$TP'_{ij} = \left\{ \begin{array}{l} (l_i, +m_j), (l_j, +m_i) \mid (f_i \Rightarrow l_i, f_j \Rightarrow l_j) \in MAT_{ij}, \\ (f_i \preceq m_i \prec l_i) \wedge \exists_{k \neq j} c_k \cdot (m_i, c_k) \in TP_{ik} \wedge \neg \exists c_j \cdot (m_i, c_j) \in TP_{ij}, \\ (f_j \preceq m_j \prec l_j) \wedge \exists_{k \neq i} c_k \cdot (m_j, c_k) \in TP_{jk} \wedge \neg \exists c_i (m_j, c_i) \in TP_{ij} \end{array} \right\}$$

For the example, 9 additional token-passing pairs are needed with a total of 27 such pairs for adequacy, as compared to 54 (=3*18) in an all pair-wise approach. It can be shown that this set is optimal as well. In particular, it can be shown that, for a multi-threaded system (with more than two threads), the set $(\cup_{i \neq j} TP_{ij}) \cup (\cup_{i \neq j} TP_{ij}')$ is both adequate and optimal.

Further Exemplary Embodiments

Figure 8:
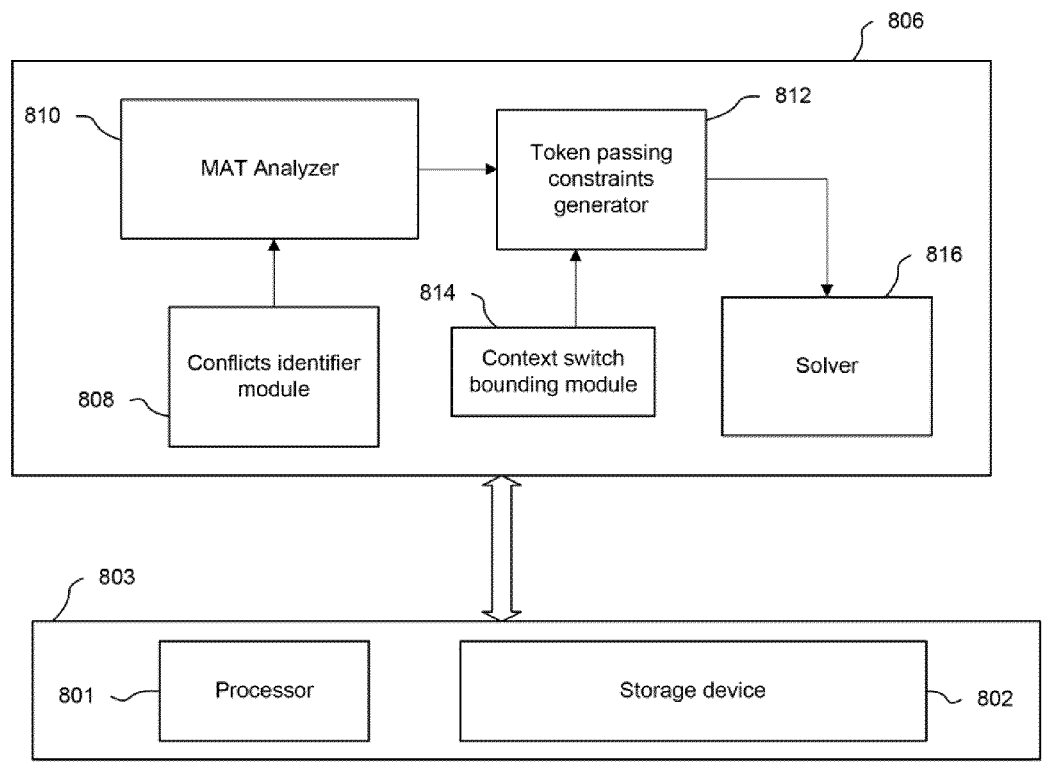
FIG. 8 is a block/flow diagram of a verification system for generating verification conditions to permit verification of a concurrent system of program threads in accordance with one exemplary embodiment of the present invention.
Figure 9:
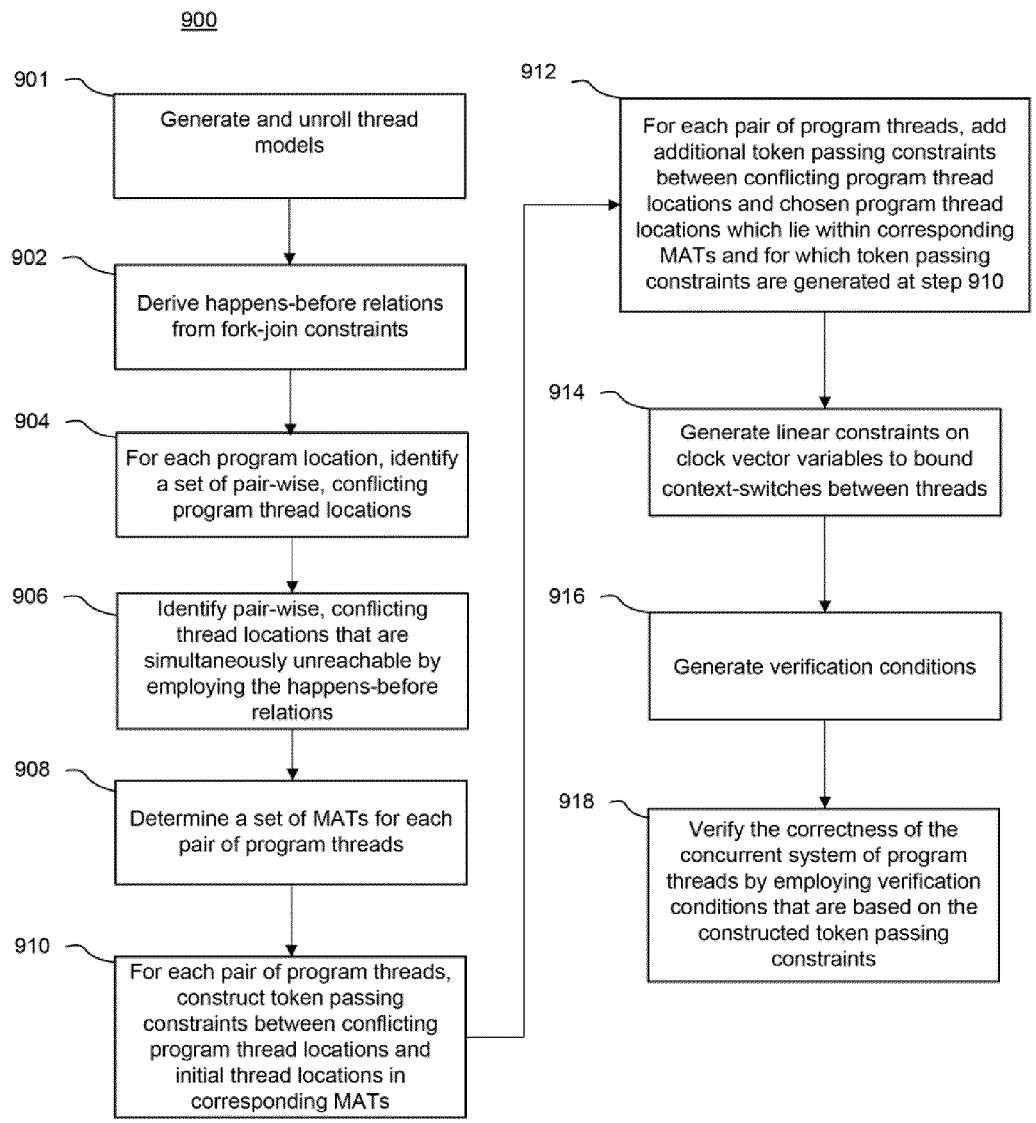
FIG. 9 is a block/flow diagram of a method for generating token-passing constraints and verifying the correctness of a concurrent system of program threads.

Turning now to FIGS. 8 and 9 with continuing reference to FIGS. 1, 4 and 5, a system 800 and a computer-implemented method 900 for reducing verification conditions and for verifying the correctness of a concurrent system of program threads in accordance with exemplary embodiments of the present invention are illustrated.

Verification system 800 may be implemented in software within an application 806 and underlying hardware, as indicated in FIG. 8. However, it should be noted that application 806 may alternatively be implemented in only hardware elements, as understood by those of ordinary skill in the art. Thus, it should be understood that the phrase "implemented on a processor and storage medium" or "implemented on a processor and a program storage device" should be understood to encompass embodiments including software implemented on hardware elements and hardware embodiments as well. Further, it should also be understood that the elements within application 806 may also be implemented on a computer readable medium comprising a computer readable program embodying a program of instructions for generating verification conditions for a concurrent system of program threads, as performed by elements within application 806. Here, the instructions are executable by a computer and may comprise one or more or all of the steps of method 900, described in more detail below. In addition the computer readable program, when executed on a computer, causes the computer to perform the instructions or method steps.

Returning system 800, in the particular exemplary embodiment illustrated in FIG. 8, verification system 800 may include a hardware platform 803, comprising a processor 801 and a storage device 802, which may comprise a program storage device, over which an application 806 may be layered. System 500 may, in certain implementations, include an application program interface and an operating system as understood by those of ordinary skill in the art. Application 806 may include a conflicts identifier module 808, a MAT analyzer 810, a token passing constraints generator 812, a context switch bounding module 814, and a Solver 816. Elements 808-816 are described further below with respect to method 900.

Method 900 may begin at step 901, in which the conflicts identifier module 808 generates and unrolls thread models for a concurrent system of program threads. For example, the thread models may be generated and unrolled as described above with respect to step 402.

At step 902, the conflicts identifier module 808 can derive happens-before relations for program thread locations from fork-join constraints. For example, the happens before relations may be derived as described above with respect to step 404. Although happens-before relations are described as being derived from fork-join constraints, they may be derived in other ways as well, as understood by those of ordinary skill in the art. For example, happens-before relations may also or alternatively be derived from mutual exclusions and/or lock acquisition patterns. Step 902 is optional, although preferred, as it permits the reduction of the set of conflicting program thread locations, which is discussed in more detail in steps 904 and 906.

At step 904, for each pair of program threads, the conflicts identifier module 808 can identify, for each pair of the program threads, a set of pair-wise, conflicting program thread locations at which access of shared memory resources by the corresponding pair of program threads is conflicting. For example, the set of pair-wise, conflicting program thread locations may be identified as described above with respect to step 406. For example, the pairs of program threads may correspond to $(M_i, M_j)$ and the set pair-wise, conflicting thread locations may correspond to the set $C_{ij}$. In addition, FIG. 1 illustrates one example of a conflict with respect to a memory resource represented by z at locations 3a of thread $M_1$ and 2b of thread $M_2$. In addition, it should also be noted that the conflicting program thread locations may be identified incrementally with increasing depth bound.

At step 906, for all sets of pair-wise, conflicting program thread locations, the conflicts identifier module 808 can identify conflicting thread locations that are simultaneously unreachable by employing the happens-before relations to reduce the sizes of sets of pair-wise, conflicting thread locations. For example, the simultaneously unreachable conflicting thread locations may be identified as discussed above with respect to step 408. For example, for all sets of $C_{ij}$, where each set of $C_{ij}$ correspond to a different pair$(M_i, M_j)$, simultaneously unreachable conflicting thread locations c may be found to reduce the size of one or more sets $C_{ij}$. It should be understood that c may alternatively be found first and simply excluded from $C_{ij}$ when constructing $C_{ij}$. As mentioned above, reducing the sizes of sets of pair-wise, conflicting thread locations is optional. However it is preferable, as reducing the size improves efficiency.

At step 908, the MAT analyzer 810 can determine a set of mutually atomic transactions for each pair of program threads. For example, the set of MATs may be determined as discussed above with respect to step 410. For example, the MAT analyzer 810 can perform method 500 to find the MATs. As discussed above, each MAT in the set of MATs, $m \in \mathcal{MAT}_{ij}$, for a particular pair of program threads $M_i, M_j$, may correspond to $(f_i \Rightarrow 1_i, f_j \Rightarrow 1_j)$. Further, there is no conflict access other than at locations $1_i$ and $1_j$, and all the transitions may not be disabled simultaneously. Thus, between threads in a corresponding pair of threads, only the last thread program locations in the transactions are conflicting.

At step 910, the token passing constraint generator 812 may construct, with respect to each pair of program threads, token passing constraints between conflicting program thread locations and initial thread locations in corresponding MATs to permit context switching between threads in a respective pair of program threads. For example, the token passing constraints may be constructed as discussed above with respect to step 412 and 416. For example, a conflicting program thread location may correspond to $1_i$, which is included in set $C_{ij}$, and an initial thread location in a corresponding MAT, $(f_i \Rightarrow 1_i, f_j \Rightarrow 1_j)$, may correspond to $f_j$. Thus, a token passing constraint may correspond to $(1_i, f_j)$. Similarly, a conflicting program thread location may also correspond to $1_j$ and an initial thread location in a corresponding MAT may correspond to $f_i$, thereby forming a token passing constraint $(1_j, f_i)$. In each case, context switching is permitted between threads $M_i$ and $M_j$ in the respective pair of program threads $(M_i, M_j)$. For example, $(1_i, f_j)$ permits a context switch from thread $M_i$ to thread $M_j$. In addition, $(1_j, f_i)$ permits a context switch from thread $M_j$ to thread $M_i$. Further, if the concurrent system is a two-threaded system, then all of the token passing constraints determined in step 910 may be the only token passing constraints used to generate verification conditions to verify the correctness of the concurrent system. For example, the token passing constraints determined in step 910 may correspond to the set $TP_{ij}$, which, as discussed above, is adequate in that it includes all token passing constraints needed to verify the concurrent system and is optimal for the two-thread case. Moreover, as noted above, the state space explored and the verification conditions are significantly reduced as compared to the previous token passing model.

At step 912, optionally, for the case in which the concurrent system has more than two threads, the token passing constraints generator 812 may add, for each pair of program threads, additional token passing constraints between conflicting program thread locations and chosen locations which lie within corresponding MATs and for which token passing constraints are generated at the constructing step 910 to permit additional context switching between the threads in the respective pair of program threads. For example, the additional token passing constraints may be constructed as discussed above with respect to steps 414 and 416. For example, a conflicting program thread location may correspond to $1_i$, which is included in set $C_{ij}$, and a chosen program thread location may correspond to $1_j^+$. As discussed above, $1_j^+$ may correspond to a next program thread location after program thread location, $1_j$, which lies within corresponding a MAT, in $f_j \Rightarrow 1_j$ in $(f_i \Rightarrow 1_i, f_j \Rightarrow 1_j)$. Further, token passing constraints for MAT $(f_i \Rightarrow 1_i, f_j \Rightarrow 1_j)$ may be generated at step 910. Thus, an additional token passing constraint may correspond to $(1_i, 1_j^+)$. Similarly, a conflicting program thread location may also correspond to $1_j$, which is included in set $C_{ij}$, and chosen program thread location may correspond to $1_i^+$. As discussed above, $1_i^+$ is a next program thread location after program thread location, $1_i$, which lies within corresponding a MAT, $f_i \Rightarrow 1_i$ in $(f_i \Rightarrow 1_i, f_j \Rightarrow 1_j)$. Accordingly, a token passing constraint $(1_j, 1_i^+)$ may be formed. In each case, additional context switching is permitted between threads $M_i$ and $M_j$ in the respective pair of program threads $(M_i, M_j)$. For example, $(1_i, 1_j^+)$ permits a context switch from thread $M_i$ to thread $M_j$. In addition, $(1_j, 1_i^+)$ permits a context switch from thread $M_j$ to thread $M_i$. Furthermore, as discussed above, the chosen program locations are conflicting with thread locations of one or more threads other than threads in the respective pair, such as $(M_i, M_j)$, of threads. Thus, token passing constraints have been generated at step 910 for the chosen thread locations with respect to other pairs of program threads.

Moreover, if the concurrent system has more than two threads, then all of the token passing constraints determined in step 910 and in step 912 may be the only token passing constraints used to generate verification conditions to verify the correctness of the concurrent system. For example, the token passing constraints determined in step 910 and step 912 may correspond to the set TP, which, for the case in which the concurrent system has more than two threads, as discussed above, is adequate in that it includes all token passing constraints needed to verify the concurrent system and is optimal. Additionally, as noted above, the state space explored and the verification conditions are significantly reduced as compared to the previous token passing model. Further, in step 910 and/or step 912, the token passing constraints may be incrementally constructed with increasing depth bound.

At step 914, optionally, the context switch bounding module 814 may generate linear constraints on clock vector variables to bound context-switches between threads. For example, linear constraints on clock vector variables may be generated as discussed above with respect to step 418 and may correspond to $CB_i^l \leq ctk \leq CB_i^n$. The constraints may be added to bound the number of times a token could be passed to a specific thread model, such as $M_i$.

At step 916, the token passing constraint generator 812 may generate verification conditions for the solver 816 using the token passing constraints and, optionally, the linear constraints on clock vector variables generated by the context switch bounding module 814. For example, the verification conditions may be generated as discussed above with respect to step 420. For example, the constraints may be translated to a quantifier-free formula and sent to a solver 816.

At step 918, the solver 816 may verify the correctness of the concurrent system of program threads by employing verification conditions that are generated based on the constructed token passing constraints. The solver 816 may thereafter output the result indicating whether the concurrent system was verified. The correctness of the concurrent system may be assessed, for example, in accordance with step 420, discussed above. In addition, the solver may, for example, correspond to an SMT/SAT solver and may perform a satisfiability check, as discussed above with respect to step 420.

In accordance with exemplary embodiments of the present invention discussed above, partial order reduction techniques are exploited in a symbolic model checking effort that generates verification conditions directly without an explicit scheduler. The exemplary embodiments reduce verification problem sizes and state space for concurrent systems using MATs. Furthermore, it can be shown that the exemplary embodiments provide both an adequate and an optimal set of token-passing constraints for a bounded unrolling of threads. Experimental results have demonstrated the efficacy of the exemplary embodiments.

As mentioned above, embodiments described herein may be entirely hardware or including both hardware and software elements. In a preferred embodiment, the present invention is implemented in software and hardware, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores the program for use by or in connection with the instruction execution system, apparatus, or device. The medium can be magnetic, optical, electronic, electromagnetic, infrared, or a semiconductor system (or apparatus or device). The medium may include a computer-readable medium such as a semiconductor or solid state memory, magnetic tape, a removable computer diskette, a random access memory (RAM), a read-only memory (ROM), a rigid magnetic disk and an optical disk, etc.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for verifying the correctness of a concurrent system of program threads comprising:
   identifying, for each pair of the program threads, a set of pair-wise, conflicting program thread locations at which access of shared memory resources by the corresponding pair of program threads is conflicting;
   determining, for each pair of the program threads, a set of mutually atomic transactions (MATs), wherein, between threads in said pair, only the last thread program locations in said transactions are conflicting;
   constructing, with respect to each pair of program threads, token passing constraints between conflicting program thread locations and initial thread locations in corresponding MATs to permit context switching between threads in a respective pair of program threads;
   adding, for each pair of program threads, additional token passing constraints between conflicting program thread locations and chosen program thread locations which lie within corresponding MATs, wherein said chosen program thread locations are conflicting with thread locations of one or more threads other than threads in said pair, and for which token passing constraints are generated at the constructing step to permit additional context switching between the threads in the respective pair of program threads; and
   verifying the correctness of the concurrent system of program threads by employing verification conditions that are generated based on the constructed token passing constraints.

2. The computer-implemented method of claim 1, wherein the token passing constraints are the only token passing constraints employed to verify the concurrent system if the system is a two-threaded system.

3. The computer-implemented method of claim 1, wherein the token passing constraints are the only token passing constraints employed to verify the concurrent system if the system has more than two threads.

4. The computer-implemented method of claim 1, further comprising:
   deriving happens-before relations for program thread locations from fork-join constraints.

5. The computer-implemented method of claim 4, further comprising:
   identifying pair-wise, conflicting thread locations that are simultaneously unreachable by employing the happens-before relations to reduce the sizes of sets of pair-wise, conflicting thread locations.

6. The computer-implemented method of claim 1, further comprising:
   generating linear constraints on clock vector variables to bound context-switches between threads.

7. The computer-implemented method of claim 1, wherein the pair-wise, conflicting program thread locations and the token passing constraints are incrementally identified and constructed, respectively, with increasing depth bound.

8. A non-transitory computer readable storage medium comprising a computer readable program embodying a program of instructions for generating verification conditions for a concurrent system of program threads, the instructions executable by a computer, wherein the computer readable program when executed on a computer causes the computer to:
   identify, for each pair of the program threads, a set of pair-wise, conflicting program thread locations at which access of shared memory resources by the corresponding pair of program threads is conflicting;

determine, for each pair of the program threads, a set of mutually atomic transactions (MATs), wherein, between threads in said pair, only the last thread program locations in said transactions are conflicting;

construct, with respect to each pair of program threads, token passing constraints between conflicting program thread locations and initial thread locations in corresponding MATs to permit context switching between threads in a respective pair of program threads;

add, for each pair of program threads, additional token passing constraints between conflicting program thread locations and chosen program thread locations which lie within corresponding MATs, wherein said chosen program thread locations are conflicting with thread locations of one or more threads other than threads in said pair, and for which token passing constraints are generated at the construct step to permit additional context switching between the threads in the respective pair of program threads; and generate verification conditions based on the token passing constraints for the concurrent system.

9. A verification system for generating verification conditions to permit verification of a concurrent system of program threads, said verification system being implemented on a processor and a program storage device and said verification system comprising:

a conflicts identifier module configured to identify, for each pair of the program threads, a set of pair-wise, conflicting program thread locations at which access of shared memory resources by the corresponding pair of program threads is conflicting;

a mutually atomic transactions (MAT) analyzer configured to determine a set of MATs for each pair of program threads; and a token passing constraint generator configured to construct, with respect to each pair of program threads, first token passing constraints between conflicting program thread locations and initial thread locations in corresponding MATs to permit context switching between threads in a respective pair of program threads, wherein said token passing constraint generator is further configured to generate verification conditions for the concurrent system, and wherein the token passing constraint generator is further configured to add, for each pair of program threads, additional token passing constraints between conflicting program thread locations and chosen program thread locations which lie within corresponding MATs, wherein said chosen program thread locations are conflicting with thread locations of one or more threads other than threads in said pair, and for which the first token passing constraints were constructed to permit additional context switching between the threads in the respective pair of program threads.

10. The verification system of claim 9, further comprising:
a solver configured to verify the correctness of the concurrent system of program threads by employing verification conditions that are generated based on the constructed token passing constraints.

11. The verification system of claim 9, wherein the token passing constraints are the only token passing constraints generated by the verification system if the concurrent system is a two-threaded system.

12. The verification system of claim 9, wherein the token passing constraints are the only token passing constraints generated by the verification system if the concurrent system has more than two threads.

13. The verification system of claim 9, wherein the conflicts identifier module is further configured to derive happens-before relations for program thread locations from fork-join constraints.

14. The verification system of claim 13, wherein the conflicts identifier module is further configured to identify pair-wise, conflicting thread locations that are simultaneously unreachable by employing the happens-before relations to reduce the sizes of sets of pair-wise, conflicting thread locations.

15. The verification system of claim 9, further comprising:
a context-switch bounding module configured to generate linear constraints on clock vector variables to bound context-switches between threads.

16. The verification system of claim 9, wherein the conflicts identifier module is further configured to incrementally identify the pair-wise, conflicting program thread locations with increasing depth bound.

17. The verification system of claim 9, wherein the token passing constraints generator is further configured to incrementally construct the token passing constraints with increasing depth bound.

* * * * *